UNITED STATES PATENT OFFICE 1,983,568

CANDY PRODUCT AND PROCESS

Reed W. Robinson and Andrew Olsen, Jr., San Francisco, Calif.

No Drawing. Application May 10, 1933, Serial No. 670,308

6 Claims. (Cl. 99—16)

This invention relates to candy and has for its object a process for producing a candy product and the product itself, which will facilitate the home candy maker in the making of certain kinds of candy, otherwise only made with difficulty. One of the objects of the invention is to provide a stable product in powdered form which may be stocked by the grocery trade and very simply made into good fudge candy with little effort or experience. Other objects and advantages of the invention will appear in the following description.

In the making of candies of the fudge type certain difficulties present themselves which require considerable skill and experience to overcome in order to secure a satisfactory result. The principal difficulty attendant with the making of this kind of candy is found in trying to obtain a fine smooth grained body and overcome the natural tendency of the sugar content to crystallize in coarse particles, and another is to cook the materials to just the right temperature to secure the proper fudge type of body.

Fudge candy may vary considerably in its formula and proportions but it consists generally of milk, corn syrup (glucose), sugar, fat, a little salt, and suitable flavoring matter such as chocolate. The ingredients are mixed, cooked to a temperature of about 235°–245° F., while being agitated, and cooled to a temperature between 90° and 120°, "creamed" by stirring, and spread out in trays to set.

If the process is not carried out with great care the mass will be disagreeably crystalline throughout, or if cooked to too high a temperature it will get too hard, or if "creamed" while too hot the grain would be too coarse. In fact, the process is one which is very difficult to carry out under ordinary home kitchen conditions with any degree of accuracy, but we have discovered that once the proper texture or graining has been imparted to the mass by careful factory procedure, that the free water may be evaporated out of the fudge until it is dry and friable, the dry mass then ground to a powder, and that this powder is a stable product which may be kept for a long time if properly packed, and yet which may easily be converted into a high grade fudge candy by the mere addition of water and sufficient heat to soften it, then spread out on a pan to cool and set.

It seems that once the graining process is properly carried out the resulting fine grain and smooth texture tends to remain a fixed characteristic of the mass which will persist through the ordinary remelting process, but which, of course, will not withstand long, hard boiling.

We have also found that the fat and flavoring matter may be omitted without impairing the grain of the product, and that these may be later added when using the dry powder to make fudge at home, and hence with a stock powder prepared in accordance with the present invention any flavor of delicious fudge may be easily made by any novice in household cookery. Also that by modifying the additions and cooking at home, a good caramel may be produced.

We have further found that our process may also be carried out with fondant and bon bon creams.

As an example of a complete and flavored fudge powder the formula could be—

| | Ounces |
|---|---|
| Milk (unsweetened evaporated) | 2 |
| Corn syrup (43° Bé. (about 16.2 water)) | ½ |
| Sugar (granulated) | 9 |
| Fat (cocoanut butter, hydrogenated, or real butter) | ½ |

Salt—to taste
*Chocolate, cocoa, or other flavoring—to taste

*Where much chocolate is used it will carry sufficient fat so that no other need be used.

The ingredients are all mixed together and cooked to about 235° to 245° F. with constant agitation, then poured out hot into a cooling, cream beater having a cold water jacket around it, where the temperature of the mass is dropped to between 90° and 120° F. before the agitator is started running and the mass is slowly plowed around until properly creamed and grained. It is then warmed to about 125° to 160° F. until it will spread, and is spread out on pans to set. If stirred from the beginning without the cooling step it would be a coarse-grained product similar to wet sugar.

A modification of the process is to cook the mass to about 235°–240° F. and then cool it between 150°–200°, and then cream it by stirring in fondant, after which the mass is spread out in layers to further cool and set.

In this case the proportions of the ingredients could be:

| | Ounces |
|---|---|
| Milk (unsweetened, evaporated) | 2 |
| Corn syrup | 2 |
| Sugar | 7 |
| Fat | ½ |

Salt—to taste.
Flavoring—to taste.

The fondant above referred to is composed of about 25% corn syrup to about 75% sugar, cooked, cooled and creamed by rapidly stirring until creamed to form the usual soft creamy filling as used in cream candies, though for bon bon creams somewhat less corn syrup is used in proportion to the sugar.

For the purpose of our invention we may omit the fat and flavoring of the example formula but proceed otherwise as described, and after the fudge has hardened it may be chopped up and be subjected to drying currents of air, or before hardening it may be subjected to further heat in an exhaust chamber to draw out substantially all of its free moisture so that it will easily powder. One way of accomplishing this is to pass the dried fudge through rollers while continually scraping it off and rolling again until sufficiently reduced and passing it through an agitating screen to remove any coarse particles. The result desired is a substantially powdered product which will quickly become soft upon stirring in hot water. It may also be possible to dry the fudge from the hot liquid condition to a powder by the air spray process. The omission of the fat in our preferred product increases the stability of the material.

To remake fudge candy from this powder, the home candy maker merely stirs some of it up in hot water in a pan, in the proportions of about four ounces of powder to a tablespoonful of water, adding a tablespoonful of butter, also the desired flavoring, heats it by placing on the stove until soft, mixes it thoroughly, and spreads it out on a greased pan to cool and set. The result is a delicious fine-grained fudge candy equal in all respects to a high grade candy factory article.

To make caramel candy with the powder, two tablespoonfuls of water are used instead of one and the mixture is cooked to the medium ball stage, i. e. when it will form medium balls when a small quantity is dropped into a glass of cold water. It is then spread out to cool and set. If nut caramels are desired, the chopped nuts are stirred in the mixture just before spreading out.

Having thus described our process and the new product produced thereby, it will be seen to provide a new material whereby any novice may easily make a good quality of a type of candy heretofore produced only under considerable difficulty by those wishing to make such candy at home, and when we use the word "fudge" in our appended claims it is understood to include such modifications of such soft candies as are set out above or fall within the spirit of the invention and scope of our appended claims.

We claim:—

1. The process of making a candy product which comprises cooking together the ingredients to normally make a soft candy body, cooling and creaming the mass while controlling the granulation thereof to produce a fine smooth texture, and thereafter drying and reducing the product to a fine state of division, and which final product is adapted to be reconstituted into a soft smooth textured candy body upon simple melting with water and heat and thereafter cooling the mass without a creaming or graining step.

2. The process of making a candy product which comprises cooking together the ingredients to normally make a fudge type candy body, cooling and creaming the mass while controlling the granulation thereof to produce a fine smooth texture, and thereafter drying and reducing the product to a powder and which powder is adapted to be reconstituted into a smooth textured fudge-type candy body upon simple melting with water and heat and thereafter cooling the mass without a creaming or graining step.

3. The process of making a candy product which comprises cooking together the ingredients to normally make a fudge type candy body minus the usual fat content, cooling and creaming the mass while controlling the granulation thereof to produce a fine smooth texture, and drying and reducing the product to a powder and which powder is adapted to be reconstituted into a smooth textured fudge-type candy body upon simple melting with water and heat and with the desired fat addition, and thereafter cooling the mass without a creaming or graining step.

4. The process of making a candy product which comprises cooking together the ingredients to normally make a fudge type candy body minus the usual fat and flavoring content, cooling and creaming the mass while controlling the granulation thereof to produce a fine smooth texture, and drying and reducing the product to a powder and which powder is adapted to be reconstituted into a smooth textured fudge-type candy body upon simple melting with water and heat and with the desired fat and flavoring addition, and thereafter cooling the mass without a creaming or graining step.

5. A new article of manufacture comprising a candy product consisting of a fudge-type pregrained smooth textured candy body in substantially dry powder form adapted to be reconstituted into a smooth textured fudge-type candy body upon remelting with water and heat and again cooling without a creaming or graining step.

6. A new article of manufacture comprising a candy product consisting of a fudge-type pregrained smooth textured candy body substantially without the usual fat content in substantially dry powder form adapted to be reconstituted into a smooth textured fudge-type candy body upon remelting with water and heat and with the desired fat addition and thereafter cooling without a creaming or graining step.

REED W. ROBINSON.
ANDREW OLSEN, Jr.